United States Patent
Trebouet

(10) Patent No.: US 8,917,981 B2
(45) Date of Patent: Dec. 23, 2014

(54) LIQUID HEATING DEVICE FOR AN AUTOMOBILE

(75) Inventor: Marcel Trebouet, Chavenay (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 961 days.

(21) Appl. No.: 13/061,535

(22) PCT Filed: Sep. 7, 2009

(86) PCT No.: PCT/EP2009/006484
§ 371 (c)(1),
(2), (4) Date: Apr. 8, 2011

(87) PCT Pub. No.: WO2010/025955
PCT Pub. Date: Mar. 11, 2010

(65) Prior Publication Data
US 2011/0188839 A1  Aug. 4, 2011

(30) Foreign Application Priority Data
Sep. 5, 2008 (FR) ...................... 08 04898

(51) Int. Cl.
*F24H 1/10* (2006.01)
*F24H 1/12* (2006.01)
*B60S 1/48* (2006.01)
*F24H 1/00* (2006.01)
*F24H 9/18* (2006.01)

(52) U.S. Cl.
CPC ............... *F24H 1/121* (2013.01); *B60S 1/487* (2013.01); *F24H 1/009* (2013.01); *F24H 9/1827* (2013.01)
USPC ............... 392/478; 392/465; 392/502

(58) Field of Classification Search
None
See application file for complete search history.

(56) References Cited

U.S. PATENT DOCUMENTS 941,215 A * 11/1909 Wade ............................ 392/494
4,177,375 A * 12/1979 Meixner ....................... 219/441
(Continued)

FOREIGN PATENT DOCUMENTS

DE  20 2006 019291 U1  2/2007
EP  0 104 673 A2  4/1984
(Continued)

OTHER PUBLICATIONS

International Search Report issued in PCT/EP2009/006484, mailed on Nov. 13, 2009, with translation, 6 pages.

*Primary Examiner* — Thor Campbell
(74) *Attorney, Agent, or Firm* — Osha Liang LLP

(57) ABSTRACT

The invention relates to a liquid heating device for an automobile that comprises at least one first part (1a) made of a heat-conducting material, a liquid flow path (10a) integrally formed in said first part (1a) for enabling a flow of liquid between an inlet and an outlet (12a), and a heating means (14) thermally coupled with said part (1a) and capable of heating said part (1a) so that the liquid flowing through said flow path can absorb the heat of said part (1a). According to the invention, the first part includes a planar bottom wall (15a) extending in a plane parallel to the flow path (10a), and the electric heating means includes a plurality of flat stones (14) having a positive temperature coefficient and arranged as a matrix in the same plane in parallel and in contact with the bottom wall (15a) as well as two electrodes in the form of two planar surfaces, each arranged in parallel and in contact with the corresponding surfaces of the flat stones of the matrix.

17 Claims, 3 Drawing Sheets

(56) References Cited

U.S. PATENT DOCUMENTS

| | | | | |
|---|---|---|---|---|
| 4,508,957 | A * | 4/1985 | Rocchitelli | 392/479 |
| 4,687,907 | A * | 8/1987 | Barkley et al. | 392/473 |
| 6,816,670 | B1 * | 11/2004 | Renau | 392/467 |
| 6,957,013 | B2 * | 10/2005 | Zimmer | 392/397 |
| 7,106,957 | B2 * | 9/2006 | Abras et al. | 392/480 |
| 7,190,893 | B2 | 3/2007 | Kuebler et al. | |
| 8,358,922 | B2 * | 1/2013 | Stickel | 392/491 |
| 8,463,117 | B2 * | 6/2013 | Yeung | 392/491 |

FOREIGN PATENT DOCUMENTS

| | | |
|---|---|---|
| EP | 0 899 985 A1 | 3/1999 |
| EP | 1 872 986 A1 | 1/2008 |
| FR | 2 404 983 A1 | 4/1979 |
| GB | 2 014 417 A | 8/1979 |
| WO | 2004/038303 A2 | 5/2004 |

* cited by examiner

LIQUID HEATING DEVICE FOR AN AUTOMOBILE

The present invention relates to a device heating a quantity of liquid for an automobile.

In the following the object of interest is mainly but not exclusively a device for heating a washing liquid capable of being connected, on the one hand to a tank containing said washing liquid and, on the other hand, to at least one nozzle positioned close to a surface to be cleaned in an automobile, such as the windscreen and/or the back window. In this case, the washing of the window surfaces is obtained through the simultaneous action of the system enabling the liquid to reach these surfaces and the wiping system using one or two wipers provided in the vehicle.

However, the present invention can also be used for washing other surfaces, for example the outer parts of the lamps or headlights or for heating any liquid.

An improved washing of the window surfaces can knowingly be obtained by heating the washing liquid before it is sprayed onto the surface to be cleaned using one nozzle or nozzles. In addition, the heated washing liquid can also facilitate windscreen defrosting operations.

Other solutions have already been provided to enable the rising of temperature of the windscreen washer liquid.

A first known solution consists in directly using the energy of the engine of the automobile to heat the washing liquid. The temperatures obtained are however too high, typically above 70° C., which creates the risks of causing serious burns to persons in the vicinity of the vehicle.

Another known solution consists in heating the liquid using the energy of the radiator of the automobile. This solution has been little used however since it is necessary to wait for the engine to heat for some time before being effectively capable of raising the temperature of the washing liquid.

In a third solution provided, a resistance directly positioned in the washing liquid tank makes it possible to heat the liquid. This solution is however not optimum because all the liquid contained in the tank must be heated each time, whereas only a small quantity of the liquid is taken, thus needlessly increasing the heating time and eventually destroying the intrinsic properties of the liquid.

The last known solutions consist in using a heating device positioned in the liquid flow path between the liquid tank and the nozzle or nozzles, thus making it possible to raise the temperature of a quantity of liquid taken from the tank when the control of the windscreen washer is actuated, generally through the control lever positioned beside the wheel and controlling among other things the actuation of the windscreen wipers. Among these solutions, the heating proper is obtained either by a direct contact or by an indirect contact of a heating resistance with the liquid to be heated.

The object of interest in the following is the heating mode by indirect contact, with the other mode of heating by direct contact having a main drawback in that the heating resistances used for directly heating the liquid are at extremely high temperatures which locally results in a vaporisation of the liquid.

A windscreen washing liquid heating device with an indirect contact is more particularly known from document U.S. Pat. No. 7,190,893, wherein electric heating devices are contacted with a mass made of a heat-conducting material, so as to heat this mass. A liquid flow path between an inlet and an outlet is directly provided in the mass. The liquid, when it flows down the flow path, thus absorbs the heat of the mass. The electric heating elements are composed of a plurality of some heating electrical resistances having a substantially cylindrical shape, extending in parallel in the mass, and preferably overmolded by the heat-conducting material forming the mass.

Such resistances, in addition to the fact they have non negligible overall dimensions, must be supplied at their connection terminals located at their two ends. In addition, the voltage in each one of the resistances must be controlled so as to control the stoppage of the supply of such resistances in an appropriate way, more particularly as soon as the liquid reaches the maximum desired temperature. The result is the necessity of providing, in the device, a printed circuit card provided with control means, typically a plurality of MOSFETs, for managing the supply of such heating resistances. Such a solution is consequently cumbersome and costly because of the various required electronic components.

The present invention aims at providing a new heating device remedying the above-mentioned drawbacks.

This purpose is reached according to the invention which provides for a liquid heating device for an automobile, including at least a first part made of a heat-conducting material that comprises at least a liquid flow path made integral in said first part in order to enable the flowing of the liquid between an inlet and an outlet and electric heating means thermally coupled with said first part capable of heating said part to enable the liquid to flow through said flow path to absorb the heat of said part, characterised in that the first part includes a planar bottom wall extending in a plane parallel to the flow path, in that the electric heating means includes a plurality of flat stones having a positive temperature coefficient arranged as a matrix in a same plane, in parallel and in thermal contact with said bottom wall, a first single electrode in the form of a planar surface positioned in parallel and in contact with a first surface of each flat stone of said matrix, and a second single electrode in the form of a planar surface arranged in parallel and in contact with a second surface opposite the first surface of each flat stone of said matrix.

The first single electrode is capable of being connected to a first direct voltage delivered by the battery of the vehicle, and a second single electrode capable of being connected to a ground voltage.

In a first possible embodiment, said first part is made of an electrical-conducting material and has an electrical connection terminal, and any one of the planar surfaces composing one of the electrodes among the first electrode or the second electrode is directly composed by the planar bottom wall of said first part.

In this case, a layer of electricity- and heat-conducting grease is preferably interposed between said bottom wall forming an electrode and the matching faces of the stones of the matrix.

In an alternative, said bottom wall forming an electrode is held against the matching faces of the matrix stones by a layer of heat-conducting glue.

In a second possible embodiment, any one of the planar surfaces composing the first electrode or the second electrode is composed of a deformable metal foil having a low thickness sandwiched between the matrix and the bottom wall of the first part, with said foil having an electrical connection terminal for receiving the first or the second direct voltage.

The device may advantageously include a second part made of the heat-conducting material, with a second flow path of the liquid formed in one piece in said second part, with said second part also including a planar bottom wall extending in a plane parallel to the second flow path. In this case, the matrix including a plurality of flat stones is positioned in parallel between the bottom walls of said first and second parts in thermal contact with each one of said bottom walls.

The second part can also be made of a heat-conducting material and have an electrical connection terminal. In this case, the bottom wall of the second part advantageously composes the other one of the electrodes among the first electrode or the second electrode.

According to another characteristic, the liquid heating device may further include a structure made of an electrically-isolating material and forming a chassis for receiving and maintaining said first and second parts and the matrix of flat parts, with said structure being capable of providing the electric interface for supplying said electrical connection terminals.

Said structure advantageously forms a substantially parallelepiped-shaped chassis defined by a peripheral wall forming a frame.

The structure may include an internal grid extending in a plane perpendicular to said peripheral wall, with each mesh of the grid having a dimension adapted for receiving one of said flat stones. The internal grid may advantageously be cast in one piece with the structure.

The peripheral wall of the structure advantageously supports a connector cast in one piece with the structure, inside which two metallic blades extend in parallel, which form two electrical connection lugs, with each blade having a free end capable of receiving the first or the second direct voltage from outside the structure. Metallic blades are for example overcast into the structure.

The advantages as well as other particularities of the invention will be described in detail in the following description, with a possible exemplary embodiment of the liquid heating device, complying with the present invention made in reference with the annexed figures, wherein.

Figure 1:
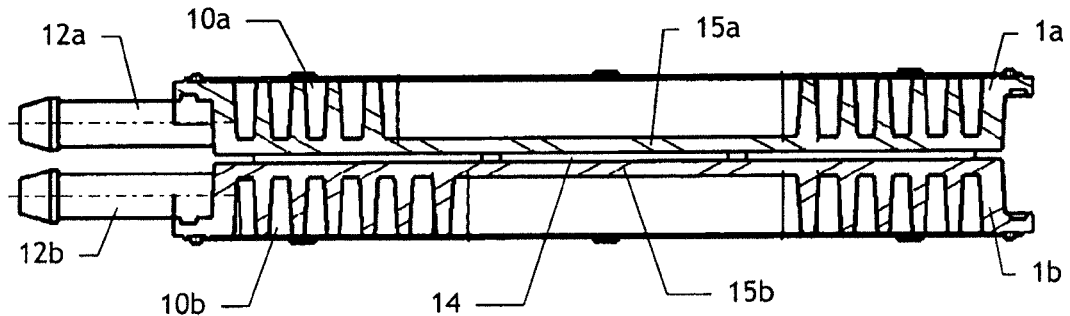
FIG. 1 illustrates a section of the main elements composing the heating device according to a preferred embodiment of the invention.
Figure 2A:
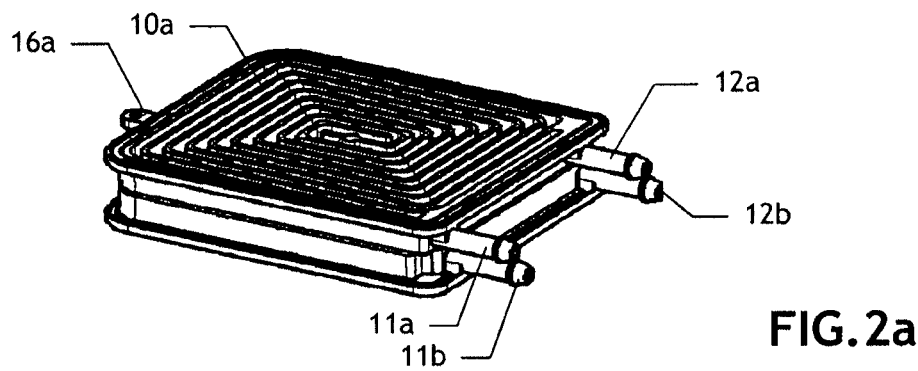
FIGS. 2a and 2b are perspective views which are respectively assembled and exploded, of the main elements of the device in FIG. 1.
Figure 2B:
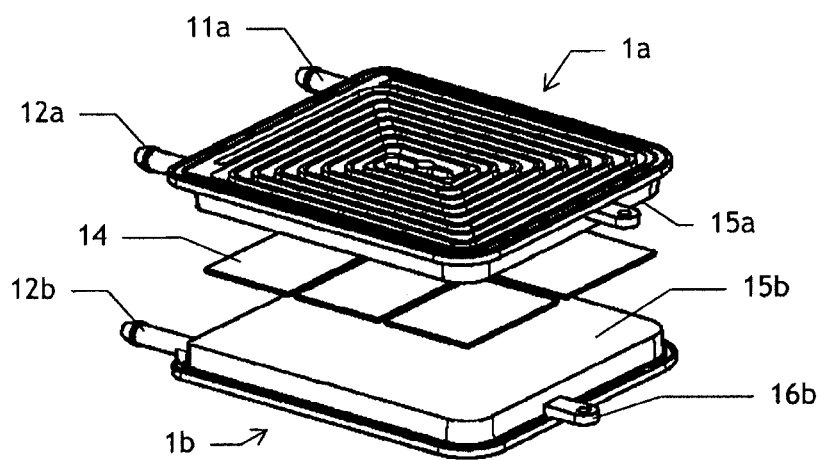

While referring to FIGS. 1, 2a and 2b which illustrate a preferred embodiment although it does not limit the invention, the liquid heating device for example includes two parts 1a, 1b made of a heat-conducting material which are substantially identical, each one integrally formed with the part to enable the flow of the liquid between an inlet 11a, 11b and an outlet 12a, 12b. Various materials can be used for producing the two parts, such as aluminium or a highly heat-conducting ceramic. For reasons which will appear in the next part of the description, a material having both high heat-conductivity and electric-conductivity will preferably be used.

The device further includes heating means in thermal contact with each one of both parts 1a, 1b used for indirectly heating the liquid flowing through the two flow paths 10a, 10b.

In order to facilitate the heat exchange between the heat-conducting material composing each one of the two parts 1a and 1b and the liquid, each flow path 10a, 10b preferably follows a track having the shape of a labyrinth, for example the shape of a spiral. In the preferred example shown, each one of said parts includes its own inlet 11a, 11b and its own outlet 12a, 12b, which are all provided with a connection end capable of sealingly receiving liquid supply pipes or tubes making it possible to connect the device, on the one hand to a liquid tank, and on the other hand, to one or several systems requiring heated liquid.

This arrangement gives great flexibility when using the heating device. For example, in the case where the liquid heating is desired to be used only for a window washing system associated with the wiping system of the vehicle windscreen, it is sufficient to provide for one inlet, for example the inlet 11a of the first part, to be connected to a washing liquid tank, for an outlet 12b of the second part to be connected to one or several nozzles of the washing system, and for the flow paths 10a and 10b to be connected in series by connecting the outlet 12a of the first part with the inlet 11b of the second part. In this case, the heating device as such includes a single inlet, here the inlet 11a, and a single outlet, here the outlet 12b.

It can also be provided to use the flow paths 10a and 10b independently, for example for washing, on the one hand, the windscreen and on the other hand the back window of the vehicle, in which case the inlet of each part will be connected to its own liquid inlet network, and the outlet of each part will be connected to its own liquid outlet network. In this case, the heating device as such has two independent inlets and two independent outlets.

In order to facilitate the connections for the liquid flow, various inlets and outlets are advantageously provided on the same side of the two parts 1a and 1b.

In addition, according to an important aspect of the present invention, each said first and second parts 1a, 1b includes a planar bottom wall 15a, 15b extending in a plane parallel to the flow path 10a, 10b being enclosed, and a plurality of stones 14 having a positive temperature coefficient are positioned as a matrix in a same plane, in parallel and in thermal contact with one of the bottom walls. The matrix which, when making the diagrams, includes six stones 14, is then sandwiched between the two bottom walls 15a, 15b, to enable an indirect heating of the liquid in the two flow paths 10a, 10b.

Using stones having a positive temperature coefficient has several advantages. First, the heating temperature obtained by electrically supplying this type of thermal resistances is self-limited. More precisely, such thermal resistances build up temperature until a substantially constant temperature value is reached, which corresponds to the so-called self-controlled temperature. Thus, it is not necessary to provide for a particular control device to obtain the regulation of such elements.

In addition, to obtain the increase in the temperature of a flat stone having a positive temperature coefficient, it is sufficient to electrically connect one of the faces thereof to a first direct voltage with the other one of the faces having a second direct voltage, typically the ground. This is used according to the invention to obtain a very compact structure by providing two electrodes for the simultaneous electrical supply of all the stones of the matrix. Then, a first electrode is placed opposite and in electrical contact with all the first faces of the stones to receive a first direct voltage value, typically the voltage delivered by the battery of the vehicle, and a second electrode is placed opposite and in an electrical contact with the assembly of the second faces of the stones, for receiving the neutral voltage value.

In a first alternative embodiment according to the invention shown in FIGS. 1 to 4, the supply electrodes are directly composed of the parts 1a and 1b. For this purpose, a material which can be both a very good heat conductor and a very good electric conductor is chosen, for example aluminium, for the production of the first and second parts 1a and 1b. In this case, it is sufficient to place the faces of the flat stones in direct contact with respectively the bottom wall 15a of the first part 1a and the bottom wall 15b of the second part 1b. A connection terminal 16a, 16b integrally formed in each one of parts 1a, 1b, for being able to connect parts respectively with the battery voltage and ground voltage should also be provided. In order to provide a correct contact, the bottom walls 15a, 15b of the parts 1a, 1b are pressed against the faces of the stones using either screws for holding the parts 1a, 1b, or a layer of glue covering each side of the surfaces of the stones. In the case where screws are used, it can advantageously be considered to interpose between the faces of the stones and the bottom walls 15a, 15a a layer of electricity- and heat-conducting grease so as to make up for the difference in the geometry of the stones 14 and unevenness for the bottom walls 15a, 15b and thus to ensure a good heat contact and electric contact. In this case where glue is used, the latter must have very good heat-conduction properties and a small electric resistance or even a null one. A layer of glue, as well as the previous layer of grease, thus makes it possible to advantageously make up for the difference in geometry of the stones 14 and the unevenness for the bottom walls 15a, 15b.

Figure 5A:
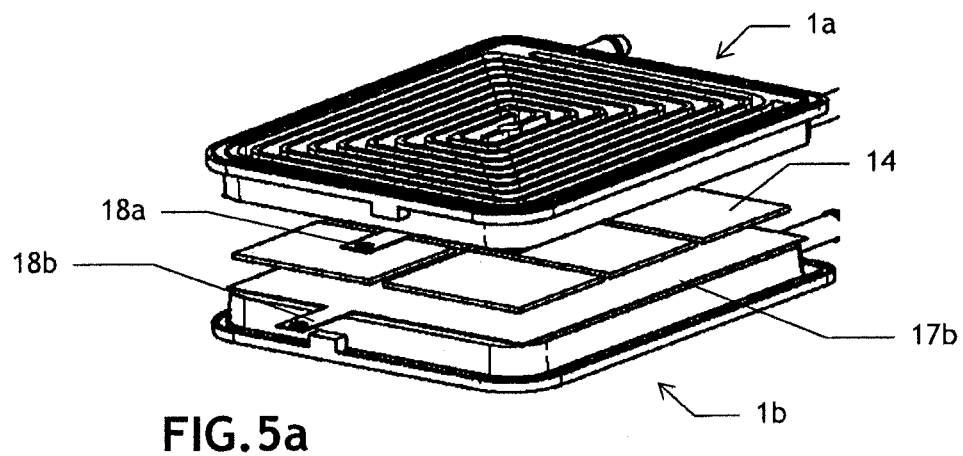
FIGS. 5a and 5b illustrate another embodiment of the device relating to the electrical supply of the heating elements, respectively in perspective, exploded and in cross-section.
Figure 5B:
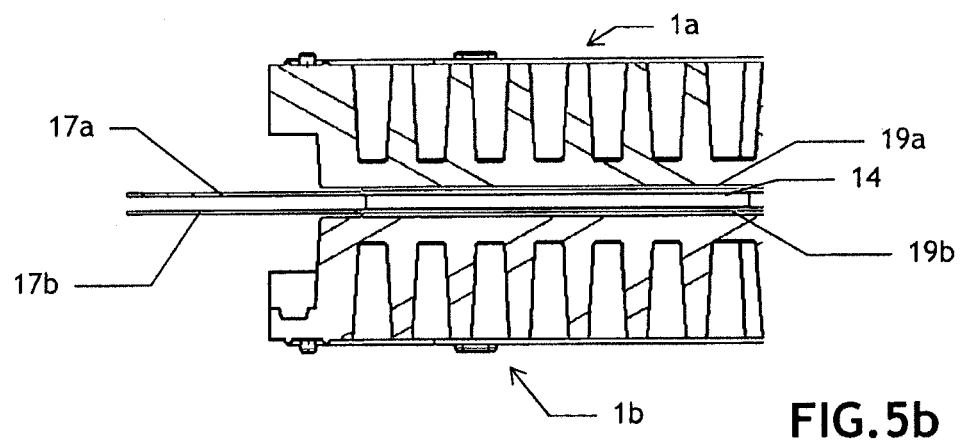

FIGS. 5a and 5b illustrate an alternative embodiment for what relates to the execution of the supply electrodes of the flat stones. Each one of the first and second electrodes is composed of a deformable and thin metal foil 17a, 17b sandwiched between one of the faces of the matrix and the bottom wall of the first part or of the second part. Each foil has an electrical connection terminal 18a, 18b for receiving the first or the second direct voltage. In this alternative embodiment, the capacity of deforming the metal foils 17a, 17b advantageously makes it possible to make up for the difference in geometry of the stones 14 and ensures a uniform application of the electrodes on the faces. A cement glue layer 19a, 19b having good thermal conduction and electrical isolation is used preferably between each bottom wall of the parts 1a, 1b and each metal foil 17a, 17b so as to provide a correct thermal contact.

Both above-mentioned embodiments have the advantage of using the same planar electrode for simultaneously supplying the same faces of the various stones, with the same electrode being either composed of the bottom wall of the parts 1a, 1b or a metal foil. This guarantees that the faces will be correctly supplied, even though some of the stones happen to break.

Each one of the two above-mentioned alternative embodiments relating to the formation of the supply electrodes further has its own advantages. Thus, for the alternative embodiment shown while referring to FIGS. 5a and 5b, the selection of the material for making the parts 1a and 1b is provided as a function of its heat-conduction capacities only. On the contrary, when the parts 1a and 1b are used as supply electrodes, the material which they are made of must necessarily be a good electric conductor in addition to being a good heat conductor. Nevertheless, this alternative embodiment has an interest in that it makes it possible to notably simplify the electrical connection interface of the device as this will be explained hereinunder while referring to FIGS. 3 and 4.

In these figures, the various elements described while referring to FIGS. 1, 2a and 2b are positioned inside a structure 2 made of an electrically-isolating material, for example in plastic material, the role of which consists in simultaneously ensuring the holding of such elements and the electrical interface between the outer supply, typically the battery of the vehicle, and the parts 1a, 1b forming electrodes for supplying the stones 14 having a positive temperature coefficient. Considering the perspective views of FIGS. 3 and 4, only the part 1a and stones 14 are visible inside this structure. This structure is however symmetrical and the part 1b is exactly positioned as is the part 1a inside this structure.

The structure 2 is a substantially parallelepiped-shaped chassis defined by a peripheral wall 20 forming a frame having sufficient dimensions to receive and enclose the various elements. An internal grid 21 formed of thin walls, preferably cast in one piece with the structure, enables the accurate positioning of the various stones 14, further preventing the stones from hitting one another. More precisely, the grid extends perpendicularly to the planes containing the peripheral wall 20 and each mesh of the grid has dimensions adapted to receive one of the flat stones 14. It is thus possible to guarantee an optimum distribution of the stones with respect to the surface of the bottom walls of the parts 1a, 1b. In addition, in the case where glue is used for holding the bottom walls 10a, 10b of the parts 1a, 1b against the faces of the stones 14, the walls of the grid 20 are advantageously used for preventing the migration of the glue which might result in short circuits. The thickness of walls must in addition be adjusted so that the surfaces of the flat stones 14 are at least flush on either side of the grid.

On one of the frame walls intended to be the closest to the corresponding connection terminals 16a, 16b of the parts 1a and 1b, the structure further includes a connector 22, preferably cast in one piece with the two electrical connection lugs 23a, 23b, preferably metallic blades overmolded into the structure, extend in parallel to the connector. The free ends of these lugs 23a, 23b, which can be accessed from outside the structure 2 by the connector and which are not visible in the figures, form the male parts of the connector intended to be respectively connected to the battery and to the vehicle ground. The two other ends on the inside of the structure are respectively connected to the parts 1a and 1b used as electrodes.

The wall of the frame opposite the one supporting the connector 22 advantageously includes four cuts 24, two at the upper level and two at the lower level, capable of receiving the ends for the connections 11a, 11b, 12a and 12b of parts 1a and 1b when these are positioned in the structure respectively from the top and from the bottom.

Figure 3:
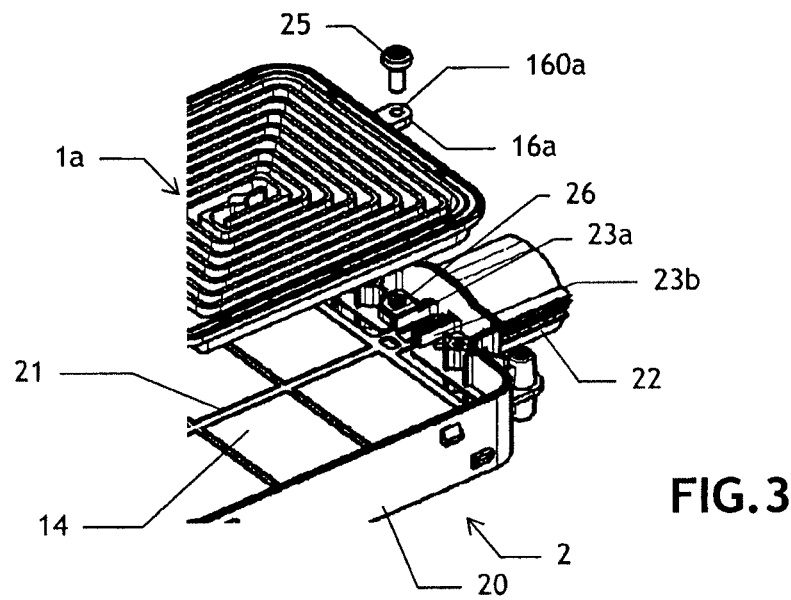
FIGS. 3 and 4 are perspective views illustrating a possible mounting of the elements of FIGS. 2a and 2b inside a structure holding the device used as an electrical connection interface of the device with the outside.
Figure 4:
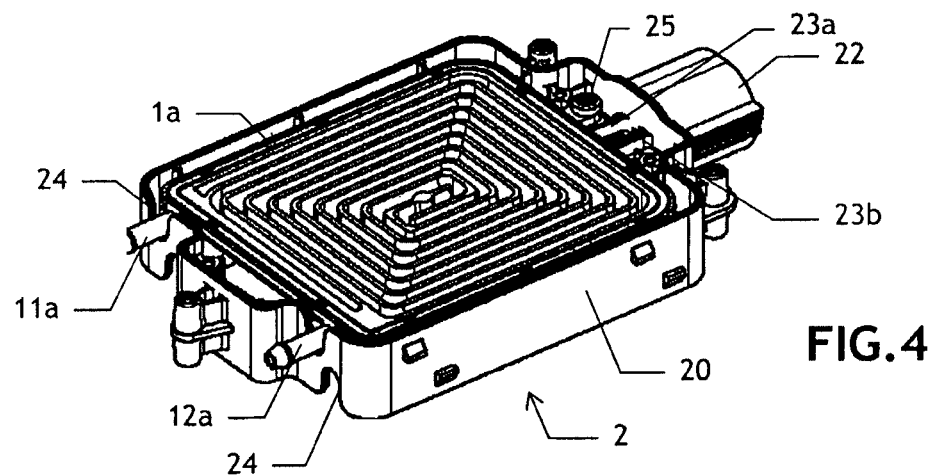

As can be seen in FIGS. 3 and 4, the part 1a is held in position inside the recess on the upper faces of the flat stones 14, more particularly through a fastening of the screw type 25-bolt 26 through an opening 160a, with which the connection terminal 16a of the part 1a is provided. The screw 25-bolt 26 fastening is made of metal and when the part 1a is positioned at the location shown in FIG. 4, the lug 23 is in contact with the bolt 26 and the part 1a is in electrical contact with the screw 25. The part 1a is thus capable of being used as the supply electrode for all the upper surfaces of the flat stones by receiving the voltage which the lug or the blade 23a will be connected to through the metallic screw 25-bolt 26 fastening. Of course, a similar screw-bolt fastening is provided for the part 1b through an opening provided in the connection terminal 16b thereof (refer to FIG. 2b), but in this case the corresponding bolt is in contact with the other lug or blade 23.

In addition, other fastening types can be considered. For example, the previous metallic bolt 26 can be replaced by any other tightening means for the metallic screw 25 enabling the holding and the electrical contacting of the screw 25 with the blade 23.

Two plastic material covers not shown are positioned on the peripheral edge of the frame to close the recess above the part 1a and under the part 1b. Both covers associated with the structure 2 by gluing or through any other sealed connection means provide the general sealing of the device.

Although in the above-described various examples the heating device includes two parts 1a, 1b, the invention can also be generalised to a heating device including only one part made of a heat-conducting material, used or not as an electrode for supplying the flat stones according to the two alternative embodiments explained hereabove, while referring to the FIGS. 3, 4, 5a and 5b. More precisely, it can be provided for the bottom wall of the part to be one of the electrodes of the flat stones, with the other electrode being for example composed of a deformable metal foil positioned against the matrix, or for both electrodes to be composed of one deformable metal foil each, one being sandwiched between the bottom wall of the part and one of the faces of the matrix, and the other one being positioned against the other face of the matrix.

In addition, even in the case where the device includes two parts 1a, 1b, the two alternative solutions described hereabove can be combined if need be: then, it can be provided for one of the electrodes to be composed of the bottom wall of one of the two parts 1a, 1b and for the other electrode to be composed of a deformable metal foil sandwiched between the matrix and the bottom wall of the other part.

The invention claimed is:

1. A liquid heating device for an automobile, comprising:
at least one first part made of a heat-conducting material;
a liquid flow path integrally formed in said at least one first part for enabling a flow of liquid between an inlet and an outlet; and
electric heating means thermally coupled with said at least one part and capable of heating said at least one part, so that the liquid flowing through said flow path can absorb the heat of said at least one part,
wherein said at least one first part comprises:
a planar bottom wall extending in a plane parallel to the flow path, wherein the electric heating means comprises a plurality of flat stones having a positive temperature coefficient and arranged as a matrix in a same plane in parallel and in thermal contact with said planar bottom wall,
a first single electrode in the form of a planar surface in parallel and in contact with a first surface of each flat stone of said matrix, and
a second single electrode in the form of a planar surface in parallel and in contact with a second surface opposite the first surface of each flat stone of said matrix,
wherein said at least one first part is made of an electrical conducting material and has an electrical connection terminal, and
wherein any one of the planar surfaces composing one of the electrodes among the first electrode or the second electrode is directly composed of the planar bottom wall of said at least one first part.

2. The liquid heating device according to claim 1, wherein the first single electrode is capable of being connected to a first direct voltage delivered by the battery of the automobile, and in that the second single electrode is capable of being connected to a ground voltage.

3. The liquid heating device according to claim 1, wherein the flat stones of the matrix are arranged as to have no contact with each other.

4. The liquid heating device according to claim 1, wherein-a layer of electricity-and heat-conducting grease is interposed between said planar bottom wall forming an electrode and the matching faces of the flat stones.

5. The liquid heating device according to claim 1, wherein said bottom wall forming an electrode is held against the matching faces of the flat stones by a heat-conducting glue.

6. The liquid heating device according to claim 1, wherein any one of the planar surfaces composing the first electrode or the second electrode is composed of a deformable metal foil having a low thickness sandwiched between the matrix and the planar bottom wall of the first part, said foil comprising a terminal for the electric connection so as to receive the first or the second direct voltage.

7. The liquid heating device according to claim 6, further comprising:
a second part made of a heat-conducting material with a second liquid flow path integrally formed in said second part, said second part comprising a planar bottom wall extending in a plane parallel to the second flow path, wherein said matrix including a plurality of flat stones is positioned parallel between the planar bottom wall of said first and second parts in thermal contact with each one of said planar bottom walls.

8. The liquid heating device according to claim 7, wherein said second part is made of an electrical conducting material and has an electrical connection terminal, the planar bottom wall of the second part composing the other one of the electrodes among the first electrode or the second electrode.

9. The liquid heating device according to claim 8, further comprising a structure made of an electrically isolating material forming a frame for receiving and holding said first and second parts and the matrix of flat stones, said structure being capable of providing an electrical interface for supplying said electrical connection terminals.

10. The liquid heating device according to claim 9, wherein said structure forms a substantially parallelepiped-shaped chassis limited by a peripheral wall forming a frame.

11. The liquid heating device according to claim 10, wherein said structure includes an internal grid extending in a plane perpendicular to said peripheral wall, with each mesh of the grid having dimensions adapted for receiving one of the flat stones.

12. The liquid heating device according to claim 11, wherein said internal grid is cast integral with the structure.

13. The liquid heating device according to claim 10, wherein the peripheral wall supports a connector cast integral with the structure, and wherein inside the connector are two metallic blades extend in parallel and form two electrical connection lugs, each blade having a free end capable of receiving the first or the second direct voltage from outside the structure.

14. The liquid heating device according to claim 13, wherein the metallic plates are overmolded in the structure.

15. The liquid heating device according to claim 13, wherein the two other ends of both metallic plates are each connected to the connection terminal respectively of the first part and the second part.

16. The liquid heating device according to claim 15, wherein each connection terminal of said parts includes an opening through which a metal screw is mounted, so that the metal screw is in electrical contact with the connection terminal and one of the two metallic blades.

17. The liquid heating device according to claim 7, wherein each planar surface composing the first electrode or the second electrode is composed of a metal foil which is deformable and has a low thickness, the metal foil being sandwiched between the matrix and, the bottom wall of the first part or the second part, and wherein each foil comprises an electrical connection terminal for receiving the first or the second direct voltage.

* * * * *